US011946358B2

(12) United States Patent
Quintero

(10) Patent No.: US 11,946,358 B2
(45) Date of Patent: Apr. 2, 2024

(54) ACOUSTIC CORPUSCULAR VELOCITY IN WELLBORE EVALUATION

(71) Applicant: Halliburton Energy Services, Inc., Houston, TX (US)

(72) Inventor: Luis F. Quintero, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 322 days.

(21) Appl. No.: 16/582,727

(22) Filed: Sep. 25, 2019

(65) Prior Publication Data

US 2020/0018150 A1 Jan. 16, 2020

Related U.S. Application Data

(63) Continuation of application No. PCT/US2019/021965, filed on Mar. 13, 2019.

(60) Provisional application No. 62/646,617, filed on Mar. 22, 2018.

(51) Int. Cl.
*E21B 47/005* (2012.01)
*G01V 1/46* (2006.01)
*G01V 1/52* (2006.01)

(52) U.S. Cl.
CPC .............. *E21B 47/005* (2020.05); *G01V 1/46* (2013.01); *G01V 1/52* (2013.01)

(58) Field of Classification Search
CPC .................................................... E21B 47/005
USPC ........................................... 367/35; 181/105
See application file for complete search history.

(56) References Cited

U.S. PATENT DOCUMENTS

| | | | |
|---|---|---|---|
| 4,131,875 A | 12/1978 | Ingram | |
| 5,081,611 A * | 1/1992 | Hornby | G01V 1/50 367/27 |
| 7,414,918 B2 * | 8/2008 | Hurst | G01V 1/46 181/105 |
| 7,787,327 B2 * | 8/2010 | Tang | E21B 47/005 367/27 |
| 7,911,876 B2 * | 3/2011 | Hurst | G01V 1/46 367/25 |
| 9,157,312 B2 * | 10/2015 | Zhao | G01V 1/44 |
| 10,655,462 B2 * | 5/2020 | Sakiyama | E21B 47/005 |

(Continued)

FOREIGN PATENT DOCUMENTS

WO 2016130599 8/2016

OTHER PUBLICATIONS

ISRWO International Search Report and Written Opinion for PCT/US2019/021965 dated Jun. 26, 2019.

*Primary Examiner* — Daniel L Murphy
*Assistant Examiner* — Amie M Ndure
(74) *Attorney, Agent, or Firm* — John Wustenberg; C. Tumey Law Group PLLC

(57) ABSTRACT

A method for determining the presence and bonding characteristics of elements which may include cement which may be bonded to a pipe string. The method for determining the presence and bonding may comprise disposing an acoustic logging tool in a wellbore, wherein the acoustic logging tool comprises a transmitter and a receiver, broadcasting a pressure pulse with the transmitter into a first material, wherein the pressure pulse reflects off an interface of the first material and a pipe string as a reflected pressure pulse, recording the reflected pressure pulse with a receiver, and determining an integrity of a material using a Quintero Wellbore Index.

22 Claims, 5 Drawing Sheets

(56) References Cited

U.S. PATENT DOCUMENTS

| | | | |
|---|---|---|---|
| 2010/0118648 A1* | 5/2010 | Zhao | G01V 1/44 367/35 |
| 2015/0168581 A1 | 6/2015 | Izuhara et al. | |
| 2016/0061021 A1 | 3/2016 | Shaposhnikov et al. | |
| 2016/0245946 A1* | 8/2016 | Kalyanraman | E21B 47/005 |
| 2016/0334539 A1* | 11/2016 | Quintero | E21B 47/005 |
| 2016/0334540 A1 | 11/2016 | Quintero et al. | |
| 2022/0268117 A1* | 8/2022 | Moellendick | E21B 23/0415 |

* cited by examiner

ACOUSTIC CORPUSCULAR VELOCITY IN WELLBORE EVALUATION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the pipe string in place. In some well installations, multiple casing strings are employed (e.g., a concentric multi-string arrangement) to allow for different operations related to well completion, production, or enhanced oil recovery (EOR) options.

During the lifetime of the well the integrity of the cement used to hold the pipe string and/or casing in place may be examined. Determining the integrity of the cement may help in determining if the pipe string may shift, fail, break, and/or the like. Currently, pipe strings may produce pressure pulses and/or interference waves, when excited, that may overshadow pressure pulses which may indicate cement bonding to a pipe string and/or a casing. An acoustic logging tool may be utilized to broadcast a pressure pulse and record a reverberated pressure pulse, which may be processed to determine the material behind a pipe string and/or a casing.

BRIEF DESCRIPTION OF THE DRAWINGS

These drawings illustrate certain aspects of some examples of the present disclosure and should not be used to limit or define the disclosure.

DETAILED DESCRIPTION

This disclosure may generally relate to methods for identifying cement bonding as well as materials behind a pipe string and/or casing with an acoustic logging tool. Acoustic sensing may provide continuous in situ measurements of parameters related to cement bonding to a pipe string and/or a casing. As a result, acoustic sensing may be used in cased borehole monitoring applications. Acoustic sensing may rely on the difference between arrival times of acoustic compressional waves (P Waves) detected from a waveform obtained when using and acoustic sensing logging tool in a borehole. These arrival times may correspond with identified ray paths between a given borehole fluid and cement of different compressive strengths.

Currently, no method or system exists in the oil industry capable of evaluating quantitively the quality of cement behind pipe, except those which are based on empirical formulas. However, current methods may be qualitative and subjective. These empirical and subjective analysis depend on the expertise of the analyst. A method and system utilizing an index based on fundamental sciences and first principles may remove subjective analysis.

Figure 1:
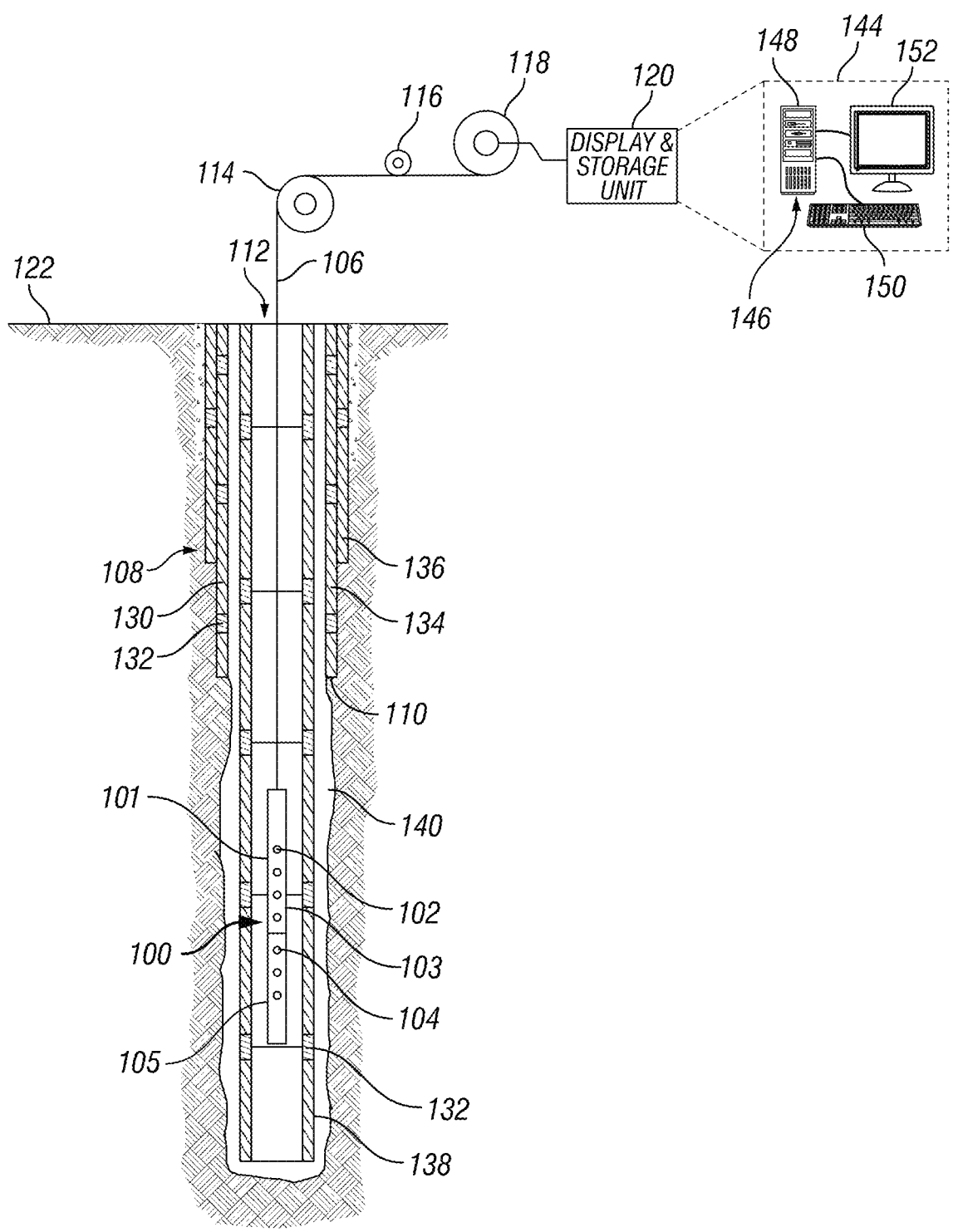
FIG. 1 illustrates a system including an acoustic logging tool.

FIG. 1 illustrates an operating environment for an acoustic logging tool 100 as disclosed herein. Acoustic logging tool 100 may comprise a transmitter 102 and/or a receiver 104. In examples, there may be any number of transmitters 102 and/or any number of receivers 104, which may be disposed on acoustic logging tool 100. Acoustic logging tool 100 may be operatively coupled to a conveyance 106 (e.g., wireline, slickline, coiled tubing, pipe, downhole tractor, and/or the like) which may provide mechanical suspension, as well as electrical connectivity, for acoustic logging tool 100. Conveyance 106 and acoustic logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in wellbore 110.

In examples, transmitter 102 may broadcast a pressure pulse into wellbore 110. The pressure pulse may be reflected and become a reflected pressure pulse recorded by receiver 104, which may be disposed on acoustic logging tool 100. The recorded pressure pulse may be stored on memory and then processed by display and storage unit 120 after recovery of acoustic logging tool 100 from wellbore 110. It should be noted that pressure pulses may be referred to as signals and/or acoustic signals. Alternatively, pressure pulses recorded by acoustic logging tool 100 may be conducted to display and storage unit 120 by way of conveyance 106. Display and storage unit 120 may process the pressure pulses, and the information contained therein may be displayed for an operator to observe and stored for future processing and reference. Alternatively, pressure pulses may be processed downhole prior to receipt by display and storage unit 120 or both downhole and at surface 122, for example, by display and storage unit 120. Display and storage unit 120 may also contain an apparatus for supplying control pressure pulses and power to acoustic logging tool 100. Typical casing string 108 may extend from wellhead 112 at or above ground level to a selected depth within wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. Acoustic logging tool 100 may be dimensioned so that it may be lowered into the wellbore 110 through pipe string 138, thus avoiding the difficulty and expense associated with pulling pipe string 138 out of wellbore 110. In examples, cement 140 may be disposed on the outside of pipe string 138. Cement 140 may further be disposed between pipe string 138 and casing string 108. It should be noted that cement 140 may be disposed between any number of casings, for example between first casing 134 and second casing 136 (not illustrated).

In logging systems, such as, for example, logging systems utilizing the acoustic logging tool 100, a digital telemetry system may be employed, wherein an electrical circuit may be used to both supply power to acoustic logging tool 100 and to transfer data between display and storage unit 120 and acoustic logging tool 100. A DC voltage may be provided to acoustic logging tool 100 by a power supply located above ground level, and data may be coupled to the DC power conductor by a baseband current pulse system. Alternatively, acoustic logging tool 100 may be powered by batteries located within the downhole tool assembly, and/or the data provided by acoustic logging tool 100 may be stored within the downhole tool assembly, rather than transmitted to the surface during logging (corrosion detection).

Acoustic logging tool 100 may be used for excitation of transmitter 102. In examples, acoustic logging tool 100 may include a housing 101 which may protect transmitter 102, receiver 103, and/or other devices disposed within logging tool 100. Without limitation, housing 101 may include a material of a measurable acoustic velocity which may be used below. In examples, housing 101 may include holes and/or grooves in which transmitter 102 and/or receiver 104 may be disposed. Additionally, transmitter 102 and receiver 104 may be disposed in different sub housing or both may be disposed in the same sub housing. For example, transmitter 102 may be disposed in sub housing 102 and receiver 104 may be disposed in sub housing 105. It should be noted that all sub housing may be disposed within housing 101.

As illustrated, one or more receiver 104 may be positioned on acoustic logging tool 100 at selected distances (e.g., axial spacing) away from transmitter 102. The axial spacing of receiver 104 from transmitter 102 may vary, for example, from about 0 inches (0 cm) to about 40 inches (102 cm) or more. In some embodiments, at least one receiver 104 may be placed near the transmitter 102 (e.g., within at least 1 inch (2.5 cm) while one or more additional receivers may be spaced from 1 foot (31 cm) to about 5 feet (152 cm) or more from the transmitter 102. It should be understood that the configuration of acoustic logging tool 100 shown on FIG. 1 is merely illustrative and other configurations of acoustic logging tool 100 may be used with the present techniques. In addition, acoustic logging tool 100 may include more than one transmitter 102 and more than one receiver 104. For example, an array of receivers 104 may be used. The transmitters 102 may include any suitable acoustic source and/or transducer for generating acoustic waves downhole, including, but not limited to, monopole and multipole sources (e.g., dipole, cross-dipole, quadrupole, hexapole, or higher order multi-pole transmitters). Specific examples of suitable transmitters 102 may include, but are not limited to, piezoelectric elements, bender bars, or other transducers suitable for generating acoustic waves downhole. Receiver 104 may include any suitable acoustic receiver suitable for use downhole, including piezoelectric elements that can convert acoustic waves into an electric pressure pulse.

Figure 2:
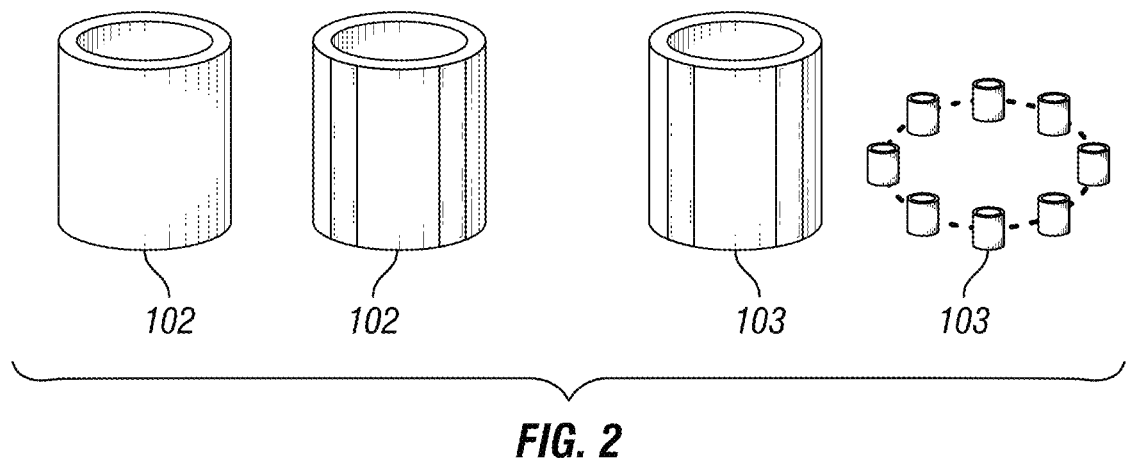
FIG. 2 illustrates an example of a transmitter and a receiver.

FIG. 2 illustrates examples of transmitter 102 and receiver 104. For examples, transmitter 102 may be cylindrical and/or segmented piezoelectric tube. Without limitation, transmitter 102 may be a transducer configured to create and broadcast a pressure pulse. Receivers 104 may include azimuthal receivers, which may record azimuthal variation of bonding behind first casing 134. Without limitation, receiver 104 may be a transducer configured to receive pressure pulse. It should be noted that pressure pulses may also be referred to as acoustic waves.

Referring back to FIG. 1, transmission of acoustic waves by transmitter 102 and the recordation of pressure pulses by receivers 104 may be controlled by display and storage unit 120, which may include an information handling system 144. As illustrated, information handling system 144 may be a component of the display and storage unit 120. Alternatively, information handling system 144 may be a component of acoustic logging tool 100. Information handling system 144 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, information handling system 144 may be a personal computer, a network storage device, or any other suitable device and may vary in size, shape, performance, functionality, and price. Information handling system 144 may include a processing unit 146 (e.g., microprocessor, central processing unit, etc.) that may process EM log data by executing software or instructions obtained from a local non-transitory computer readable media 148 (e.g., optical disks, magnetic disks). The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with acoustic logging tool 100 and/or software executed by processing unit 146. For example, information handling system 144 may enable an operator to select analysis options, view collected log data, view analysis results, and/or perform other tasks.

In examples, acoustic logging tool 100 may be utilized to evaluate the integrity of cement 140 between pipe string 138 and casing string 108 (e.g., Referring to FIG. 1). In examples, acoustic logging tool 100 may be able to evaluate integrity of cement between any two casings, for example, first casing 134 and second casing 136. As disclosed, cement 140 may be evaluated by acoustic logging tool 100 but other materials in wellbore 110 (e.g., Referring to FIG. 1) that may be disposed between pipe string 138 and casing string 108. To evaluate integrity of cement 140 an index may be utilized.

A Quintero Wellbore Index ("QWI") may be implemented to evaluate the integrity of cement 140. The QWI may perform evaluations of integrity of cement 140 based on acoustic corpuscular theory by identifying specific ray paths. In examples, the QWI may use properties and/or characteristics of acoustic logging tool 100 in determining the integrity of cement 140. It should be noted that the QWI may also be used to determine the integrity of any material based on acoustic corpuscular theory. For example, as discussed above, acoustic logging tool 100 may comprise devices such as transmitters 102 and/or receiver 104 (e.g., referring to FIG. 1 and FIG. 2). The distance between any sensors may be defined as "S." Additionally, the outer radius of transmitter 102 may be defined as $T_{OD}$ and of the outer radius of receiver 104 may be defined as $R_{ao}$.

Figure 3:
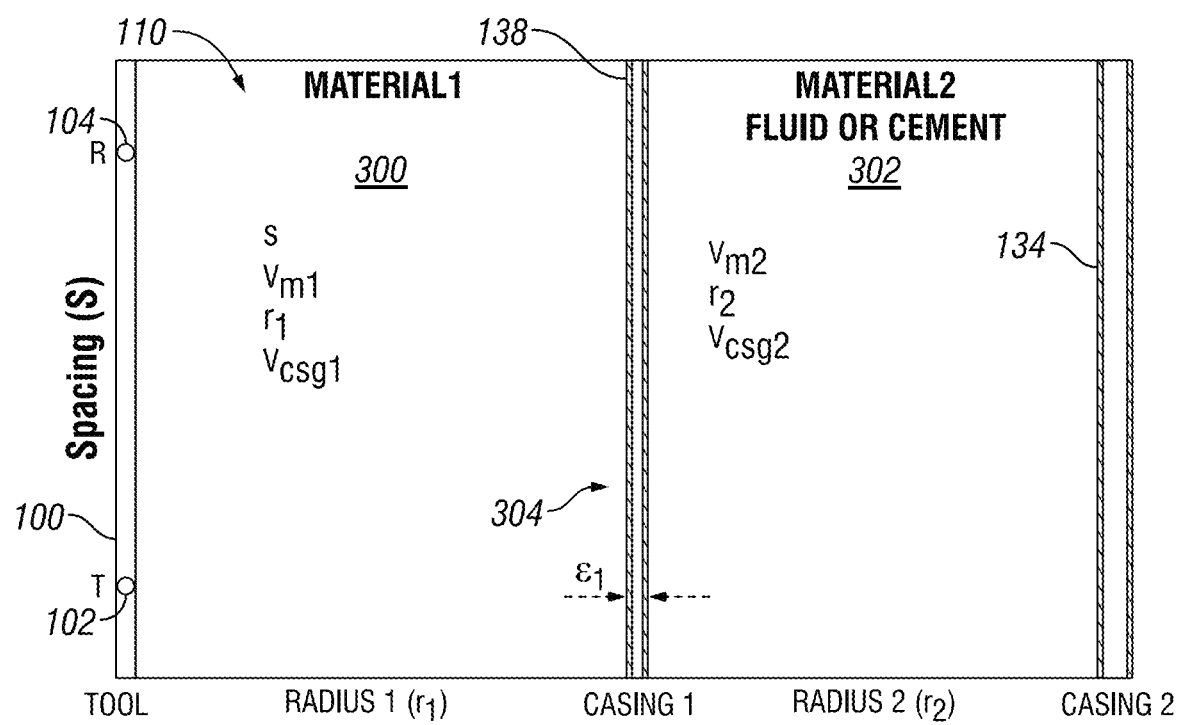
FIG. 3 illustrates an example of a downhole wellbore environment in which the acoustic logging tool may be disposed.

FIG. 3 illustrates an environment that acoustic logging tool 100 may encounter in wellbore 110. As illustrated acoustic logging tool 100 comprising transmitter 102 and/or receiver 104 may be disposed at a variable distance from pipe string 138. Cement 140 (e.g., referring to FIG. 1) may be disposed between pipe string 138 and first casing 134. It should be noted that a first material 300 may be disposed in wellbore 100 and a second material 302 may be cement 140, a fluid, other material, and/or any combination thereof. Additionally, the internal diameter of pipe string 138 is defined as a first radius, $r_1$. Pipe string 138 has a thickness, $\varepsilon_1$, and is made of a certain material of acoustic velocity $V_{cgst}$. Additionally, first material 300 may comprise an acoustic compressional velocity of $V_{m1}$, and may be a fluid such as water, gas, oil, mud, or a very dense material, such as barite, old drilling mud. Similarly, second material 302 may water, gas, oil, mud, or a dense material, such as barite, old drilling mud or solid cement of unspecified density and compressive strength. Second material 302 has a certain acoustic velocity $V_{m2}$ and may be surrounded by either a first casing 134 or a borehole wall. The radius or distance between pipe string 138 and first casing 134 may be defined as $r_2$.

During operations, when transmitter 102 (e.g., Referring to FIG. 1) broadcast a pressure pulse of any given intensity and any duration, the acoustic corpuscular theory of acoustic propagation indicates that every new corpuscle becomes a source. Thus, at an interface 304 between first material 300 and pipe string 138, the point of contact will irradiate a new ray that will transmit to second material 302, and so forth. Theoretical evaluation of the maximum time that the slowest environment may produce is limited by the largest diameter that may be investigated. In such examples, first material 300 and second material 302 may be fluids that include water or gas and the material of pipe string 138 may be steel. The measurement of the pressure pulse through time and sampling may help determine integrity of cement 140.

Figure 4:
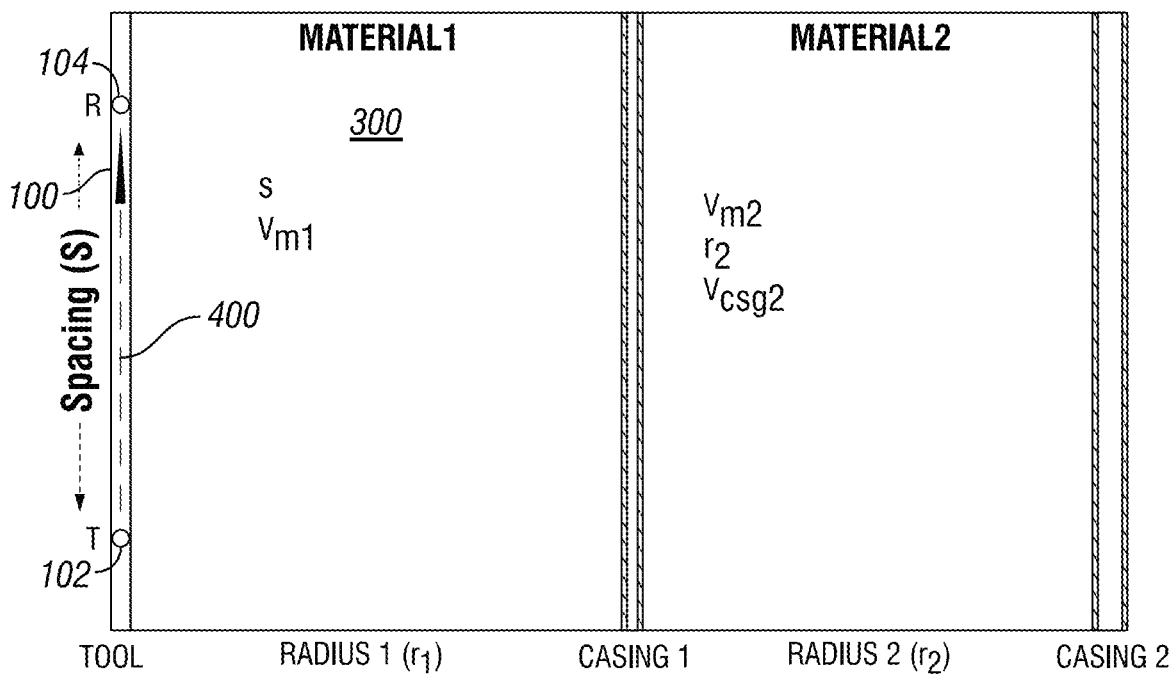
FIG. 4 illustrates an example of a path of a pressure pulse in the wellbore environment.

In an example, as illustrated in FIG. 4, when transmitter 102 transmits a pressure pulse from acoustic logging tool 100 of a given intensity and duration, first material 300 exhibits numerous ray paths, according to acoustic corpuscular theory. It should be noted that pressure pulses travel along ray paths. The use of pressure pulses and ray paths may be used interchangeable as described below. As illustrated, pressure pulse 400, $A_O$, may be defined as a direct ray between transmitter 102 and receiver 104. The time for receiver 104 to detect default pressure pulse 400, $A_O$, may be determined by two parameters, S and Vm1, of which S is known a priory since is a specification of acoustic logging tool 100. Equation 1 may be used to determine the time for receiver 104 to detect default pressure pulse 400, $A_O$, shown below:

$$tA_o = \frac{S}{V_{m1}} \quad (1)$$

Figure 5:
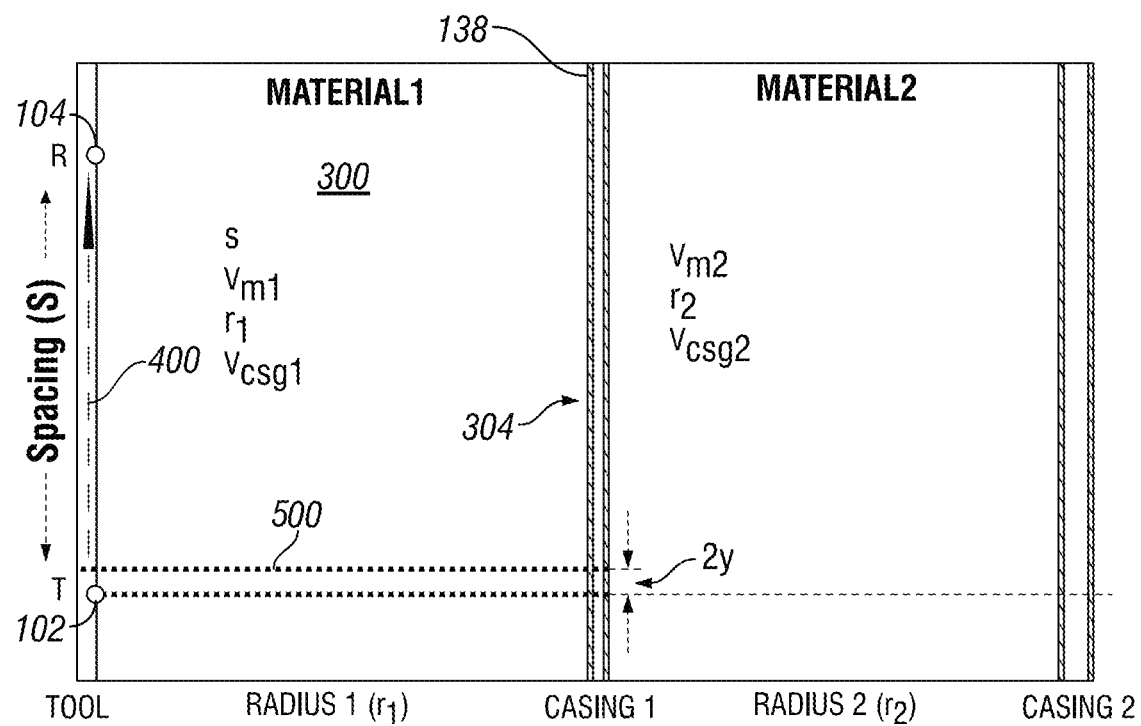
FIG. 5 illustrates another example of a path of the pressure pulse in the wellbore environment.

FIG. 5 illustrates a pressure pulse moving along a first ray 500, A1. As illustrated the first ray, or pressure pulse, may be transmitted from transmitter 102, reach interface 304 between first material 300 and pipe string 138, reflect off interface 304 and disturb default pressure pulse 400, $A_O$, disposed on acoustic logging tool 100.

The fastest first ray 500, A1, may be the ray that bounces perpendicular to pipe string 138, i.e. y=0. To determine this travel time, $tA_1$, first radius, $r_1$, may need to be found in addition to the parameters needed for default pressure pulse 400, $A_O$. The equation for all rays that bounce back to the path of default pressure pulse 400, $A_O$, as a function of a vertical distance where the contact occurs, is given below:

$$tA_o = \frac{\sqrt[2]{r_1^2 + y_1^2} + (S - 2y_1)}{V_{m1}} \quad (2)$$

The number of ray paths, or pressure pulses, increases as new environments and interfaces may be encountered. The methods disclosed herein may not be limited by any number of transmitted rays.

Figure 6:
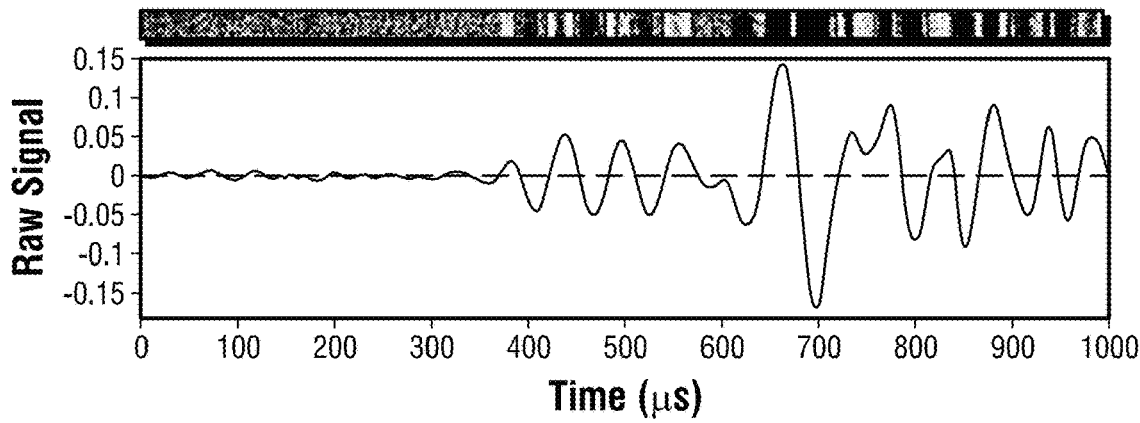
FIG. 6 illustrates a reflected pressure pulse recorded by the receiver.

FIG. 6 illustrates a reflected pressure pulse recorded by receiver 104 (i.e., referring to FIG. 1). As the pressure pulse arrives at receiver 104, it may disturb a reflected pressure pulse that receiver 104 may also be recording. Although the pressure pulses themselves are multiple and with complex interference patterns, the QWI method may be implemented when a recorded reflected pressure pulse disturbs the status-quo.

For example, generally, at around 300 microseconds a disturbance may occur. A disturbance may also occur at about 600 and 750 microseconds. The QWI may be able to explain and predict when these disturbances occur.

Figure 7:
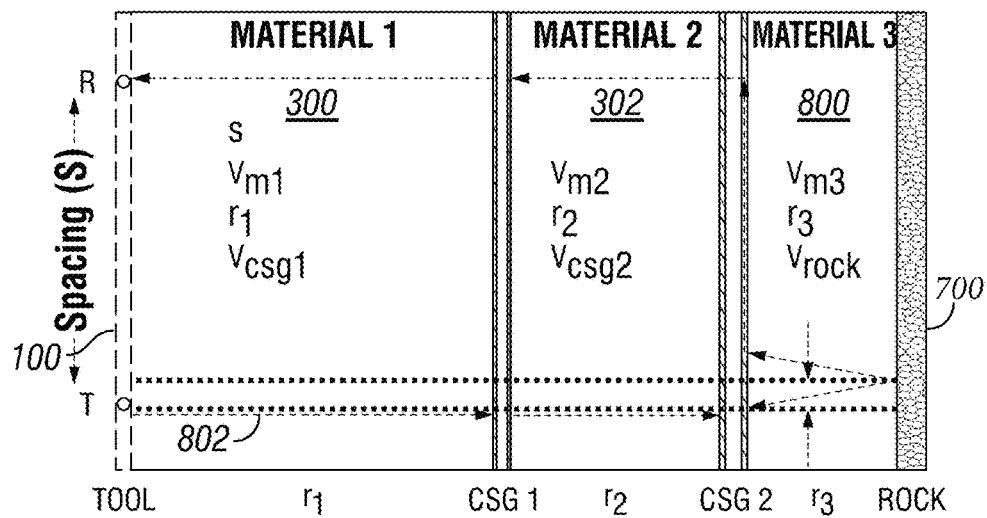
FIG. 7 illustrates another example of a pressure pulse in the wellbore environment.

FIG. 7 illustrates a schematic path of a pressure pulse in wellbore 110 (e.g., referring to FIG. 1). Since the time when a new pressure pulse arrives is given by equations that depend on the acoustic velocity of first material 300, second material 302, and third material 800 an inverse model of these times yields those velocities. For example, the time of arrival of a $C_1$ ray 802, ($t_{c1}$), may be predicted using the equation below:

$$tC_1 = \frac{2r_1}{V_{m1}} + \frac{2w_{csg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}} \quad (3)$$

If third material 800 is cement, the velocity of said cement, $V_{m3}$ will have direct influence on $C_1$ ray 802, (tc1). The QWI may include a series of indices, whereby the theoretical arrival time of a ray path influenced by zones, which may include specified material, may be evaluated and may be compared to the range of arrival times in the extremes of 100% water and 100% solid, fast cement. The equation below may be a general relationship of the QWI of a zone of interest.

$$QWI = \left( \frac{\text{Arrival time of appropriate ray} - \text{Arrival time of theoretical ray with fast cement}}{\text{Arrival time of theoretical ray if zone 100\% filled with water} - \text{Arrival time of } theoretical ray \text{ with fast cement}} \right) \quad (4)$$

If the zone of interest, as illustrated in FIG. 7 is from acoustic logging tool 100 to wellbore surface 700, is examined by $C_1$ ray 802, for example, as in the case presented above, then:

$$QWI = \left( \frac{t_{C1} - t_{C1(fast\ cement)}}{t_{C1(100\%\ water)} - t_{C1(fast\ cement)}} \right) \quad (5)$$

Figure 8:
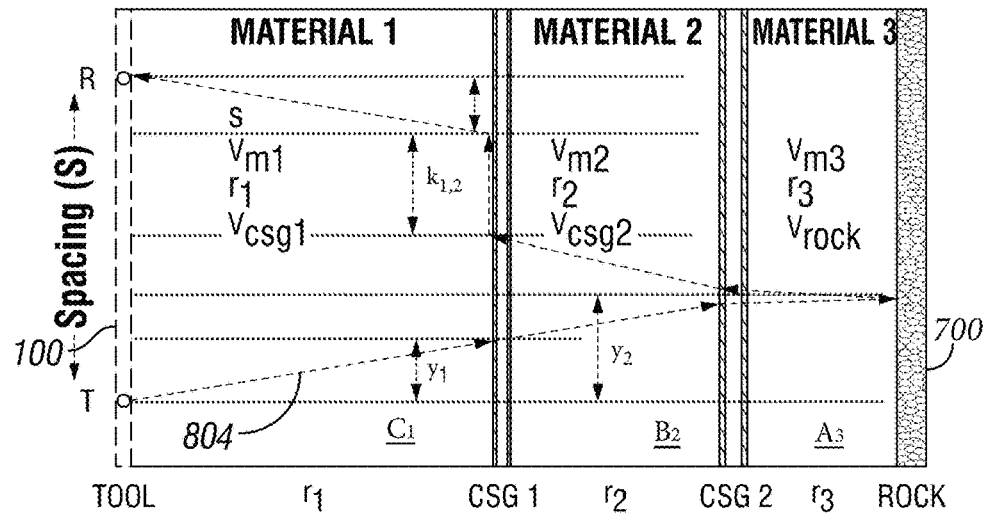
FIG. 8 illustrates another example of one or more pressure pulses in the wellbore environment.
Figure 9:
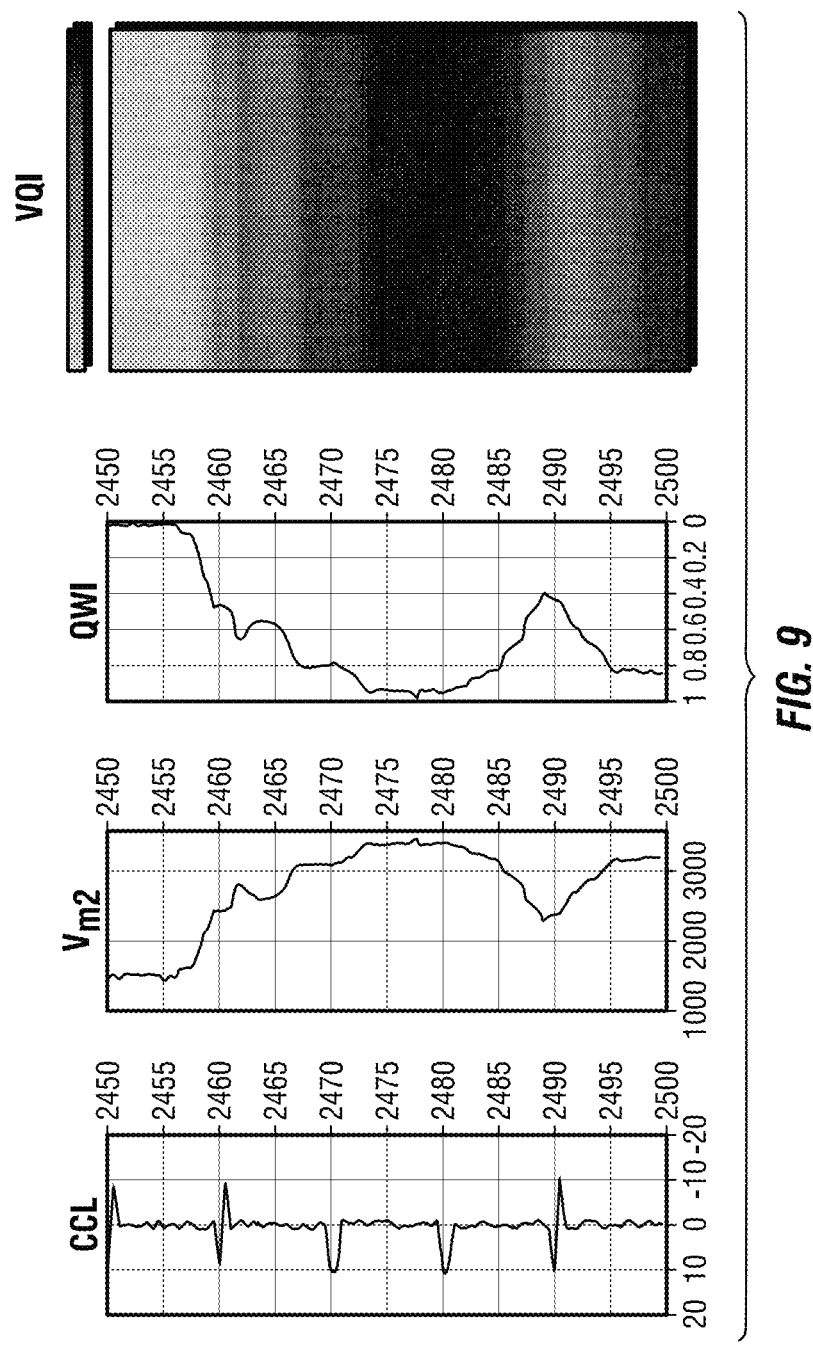
FIG. 9 illustrates different representations of a Quintero Wellbore Index.

As illustrated in FIG. 8, other versions of the QWI may include the summary or average of rays ($C_0$, $C_1$, $C_2$, $C_3$, $C_4$) in the zone of interest (i.e., from acoustic logging tool 100 to wellbore surface 700) or rays that interfere other rays, like the influence of $C_1$ rays in the B2 rays disturbing the A3 ray which form ray 804. A graphical representation of the QWI may be numerical values versus depth, showing velocity, the normalized QWI or a color-coded Index—the Variable Cement Index, VCI, as illustrated in FIG. 9.

In further examples, methods utilizing the QWI may include combinations that may be the average, minimum and/or maximum QWI's obtained in successive depths. The QWI may also include scenarios where the predominant fluid that could be present in the zone of interest with cement is hydrocarbon, mud, but necessarily water.

This method and system may include any of the various features of the compositions, methods, and system disclosed herein, including one or more of the following statements.

Statement 1. A method for determining cement bonding may comprise: placing an acoustic logging tool in a wellbore, wherein the acoustic logging tool comprises: a transmitter on the acoustic logging tool, wherein the transmitter is configured to broadcast a pressure pulse; and a receiver on the acoustic logging tool, wherein the receiver is configured to record a reflected pressure pulse; broadcasting the pressure pulse with the transmitter into a first material, wherein the pressure pulse reflects off an interface of the first material and a pipe string as the reflected pressure pulse; recording the reflected pressure pulse with a receiver; and determining an integrity of a material using a Quintero Wellbore Index based at least in part on the reflected pressure pulse, wherein the Quintero Wellbore Index is a series of indices including one or more arrival times of one or more rays through a zone of interest.

Statement 2. The method of statement 1, further comprising broadcasting a default pressure pulse from the transmitter to the receiver.

Statement 3. The method of statement 2, wherein the time for the default pressure pulse to move between the transmitter and the receiver is determined by $$tA_o = \frac{S}{V_{m1}},$$

where $tAo$ is the time, $S$ is the distance between the transmitter and the receiver, and $Vm1$ is an acoustic compressional velocity.

Statement 4. The method of statement 1 or 2, wherein the pressure pulse is a first ray, wherein the first ray bounces perpendicular to a pipe string.

Statement 5. The method of statement 4, wherein a travel time for the first ray is determined by $$tA_o = \frac{\sqrt[2]{r_1^2 + y_1^2} + (S - 2y_1)}{V_{m1}},$$

wherein $tA_0$ is the travel time, $r_1$ is a first radius, y is the first ray location on an x and y plane, S is a distance between the transmitter and the receiver, and $V_{m1}$ is an acoustic compressional velocity.

Statement 6. The method of statements 1, 2, or 4, further comprising broadcasting a C1 ray and recording the C1 ray.

Statement 7. The method of statement 6, wherein a time of arrival of the C1 ray is determined by $$tC_1 = \frac{2r_1}{V_{m1}} + \frac{2_{wcsg1}}{V_{csg1}} + \frac{2r_2}{V_{m2}} + \frac{\sqrt[2]{r_3^2 + y_3^2}}{V_{m3}} + \frac{(S - 2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, and $V_{m3}$ is an acoustic compressional velocity of a third material.

Statement 8. The method of statements 1, 2, 4, or 6, wherein a general relations of the Quintero Wellbore Index for the zone of interest with, is determined by, $$QWI = \left( \frac{\text{Arrival time of appropriate ray} - \text{Arrival time of theoretical ray with fast cement}}{\text{Arrival time of theoretical ray if zone } 100\% \text{ filled with water} - \text{Arrival time of } theoretical ray \text{ with fast cement}} \right).$$

Statement 9. The method of statement 8, wherein the zone of interest is examined by a C1 ray the general relation is determined by $$QWI = \left( \frac{t_{C1} - t_{C1(fast\ cement)}}{t_{C1(100\%\ water)} - t_{C1(fast\ cement)}} \right).$$

Statement 10. The method of statement 9, wherein the Quintero Wellbore Index identifies the integrity of the material attached to a second material.

Statement 11. The method of statements 1, 2, 4, 6, or 8, wherein the pressure pulse traverses through a second material and is reflected of a first casing.

Statement 12. The method of statement 11, wherein the second material is water, gas, oil, mud, or a dense material including barite, used drilling mud, or solid cement of unspecified density and compressive strength.

Statement 13. The method of statement 11, wherein the pressure pulse traverses through a third material and is reflected off a second casing.

Statement 14. The method of statement 13, wherein the third material is water, gas, oil, mud, or a dense material including, barite, used drilling mud or solid cement of unspecified density and compressive strength.

Statement 15. A well measurement system for determining cement bonding comprising: an acoustic logging tool, wherein the acoustic logging tool comprises: at least one transmitter, wherein the at least one transmitter is configured to broadcast a pressure pulse; and at least one receiver, wherein the at least one receiver is configured to record a reflected pressure pulse; a conveyance, wherein the conveyance is attached to the acoustic logging tool; and an information handling system, wherein the information handling system is configured to determine an integrity of a material using a Quintero Wellbore Index based at least in part on the reflected pressure pulse, wherein the Quintero Wellbore Index is a series of indices including one or more arrival times of one or more rays through a zone of interest.

Statement 16. The well measurement system of statement 15, wherein the acoustic logging tool comprises a housing and the housing has a specific acoustic velocity.

Statement 17. The well measurement system of statement 16, wherein the housing comprises holes or grooves.

Statement 18. The well measurement system of statement 15 or 16, wherein the at least one receiver is disposed in a first sub housing and the at least one transmitter is disposed in a second sub housing.

Statement 19. The well measurement system of statement 18, wherein the first sub housing and the second sub housing are disposed in the housing of the acoustic logging tool.

Statement 20. The well measurement system of statements 15, 16, or 18, wherein the at least one transmitter and the at least one receiver are transducers and the at least one transmitter has a radius defined as $r_t$ and the at least one receiver has a radius defined as $r_R$.

The preceding description provides various examples of the systems and methods of use disclosed herein which may contain different method steps and alternative combinations of components.

It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for determining an integrity of a material, comprising:
    placing an acoustic logging tool in a wellbore, wherein the acoustic logging tool comprises:
        a transmitter on the acoustic logging tool to broadcast a pressure pulse; and
        a receiver on the acoustic logging tool to record a reflected pressure pulse;
    broadcasting the pressure pulse with the transmitter into a first material, wherein the pressure pulse reflects off an interface of the first material and a pipe string as the reflected pressure pulse;
    recording the reflected pressure pulse with a receiver; and
    determining the integrity of the material using a Quintero Wellbore Index based at least in part on the reflected pressure pulse, wherein the Quintero Wellbore Index is a series of indices, wherein each index from the series of indices comprises one or more ray paths through a zone of interest, wherein an arrival time of a ray path from the one or more ray paths are subtracted by a theoretical arrival time, wherein the theoretical arrival time is an arrival time of a theoretical ray path traveling through a theoretical zone of interest, and wherein the theoretical zone of interest is 100% water or 100% fast solid cement.

2. The method of claim 1, further comprising broadcasting a default pressure pulse from the transmitter to the receiver.

3. The method of claim 2, wherein the time for the default pressure pulse to move between the transmitter and the receiver is determined by $$tA_o = \frac{S}{V_{m1}},$$

where tAo is the time, S is the distance between the transmitter and the receiver, and Vm1 is an acoustic compressional velocity.

4. The method of claim 1, wherein the pressure pulse is a first ray, wherein the first ray bounces perpendicular to a pipe string.

5. The method of claim 4, wherein a travel time for the first ray is determined by $tA_o = 2\sqrt{r_1^{\,1}+y_1^{\,2}}+(s-2y_1)/V_{m1}$, wherein $tA_0$ is the travel time, $r_1$ is a first radius, y is the first ray location on an x and y plane, S is a distance between the transmitter and the receiver, and $V_{m1}$ is an acoustic compressional velocity.

6. The method of claim 1, wherein a time of arrival of a C1 ray is determined by $$tC_1 = \frac{2_{r1}}{V_{m1}} + \frac{2_{wcsg1}}{V_{csg1}} + \frac{2_{r2}}{V_{m2}} + \frac{\sqrt[2]{r_3^2+y_3^2}}{V_{m3}} + \frac{(S-2y_3)}{V_{csg2}},$$

wherein $tC_1$ is the time of arrival, $r_1$ is a first radius, y is the first ray location on an x and y plane, S is a distance between the transmitter and the receiver, $V_{m1}$ is an acoustic compressional velocity of a first material, $V_{m2}$ is an acoustic compressional velocity of a second material, $V_{m3}$ is an acoustic compressional velocity of a third material, and the C1 ray is the ray path within a first zone of interest.

7. The method of claim 1, wherein a general relation of the Quintero Wellbore Index for the zone of interest is determined by, $$QWI = \left( \frac{\text{Arrival time of appropriate ray} - \text{Arrival time of theoretical ray with fast cement}}{\text{Arrival time of theoretical ray if zone } 100\% \text{ filled with water} - \text{Arrival time of } theoretical ray \text{ with fast cement}} \right).$$

8. The method of claim 7, wherein the Quintero Wellbore Index identifies the integrity of the material attached to a second material.

9. The method of claim 1, wherein the pressure pulse traverses through a second material and is reflected of a first casing.

10. The method of claim 9, wherein the second material is water, gas, oil, mud, or a dense material including barite, used drilling mud, or solid cement of unspecified density and compressive strength.

11. The method of claim 9, wherein the pressure pulse traverses through a third material and is reflected off a second casing.

12. The method of claim 11, wherein the third material is water, gas, oil, mud, or a dense material including, barite, used drilling mud or solid cement of unspecified density and compressive strength.

13. The method of claim 1, wherein the transmitter is a first piezoelectric element, a bender bar, or a transducer and the receiver is a second piezoelectric element, a second bender bar, or a second transducer.

14. The method of claim 1, wherein the integrity of the material identifies cement bonding to the pipe string or a casing.

15. A well measurement system for determining an integrity of a material comprising:
an acoustic logging tool, wherein the acoustic logging tool comprises:
at least one transmitter to broadcast a pressure pulse; and
at least one receiver to record a reflected pressure pulse;
a conveyance, wherein the conveyance is attached to the acoustic logging tool; and
an information handling system, wherein the information handling system is configured to determine the integrity of the material using a Quintero Wellbore Index based at least in part on the reflected pressure pulse, wherein the Quintero Wellbore Index is a series of indices, wherein each index from the series of indices comprises one or more ray paths through a zone of interest, wherein an arrival time of a ray path from the one or more ray paths are subtracted by a theoretical arrival time, wherein the theoretical arrival time is an arrival time of a theoretical ray path traveling through a theoretical zone of interest, and wherein the theoretical zone of interest is 100% water or 100% fast solid cement.

16. The well measurement system of claim 15, wherein the at least one receiver is disposed in a first sub housing and the at least one transmitter is disposed in a second sub housing.

17. The well measurement system of claim 16, wherein the first sub housing and the second sub housing are disposed in a housing of the acoustic logging tool.

18. The well measurement system of claim 15, wherein the at least one transmitter and the at least one receiver are transducers and the at least one transmitter has a radius defined as $r_t$ and the at least one receiver has a radius defined as $r_R$.

19. The well measurement system of claim 15, wherein the at least one transmitter is a first piezoelectric element, a bender bar, or a transducer and the at least one receiver is a second piezoelectric element, a second bender bar, or a second transducer.

20. The well measurement system of claim 15, wherein a general relation of the Quintero Wellbore Index for the zone of interest is determined by, $$QWI = \left( \frac{\text{Arrival time of appropriate ray} - \text{Arrival time of theoretical ray with fast cement}}{\text{Arrival time of theoretical ray if zone } 100\% \text{ filled with water} - \text{Arrival time of } theoretical ray \text{ with fast cement}} \right).$$

21. The well measurement system of claim 15, wherein the integrity of the material is a cement bonding behind a pipe string or a casing.

22. A method for determining an integrity of a material, comprising:
placing an acoustic logging tool in a wellbore, wherein the acoustic logging tool comprises:
a transmitter on the acoustic logging tool to broadcast a pressure pulse; and
a receiver on the acoustic logging tool to record a reflected pressure pulse;
broadcasting the pressure pulse with the transmitter into a first material, wherein the pressure pulse reflects off an interface of the first material and a pipe string as the reflected pressure pulse;
recording the reflected pressure pulse with a receiver; and
determining the integrity of the material using a Quintero Wellbore Index based at least in part on the reflected pressure pulse, wherein the Quintero Wellbore Index is a series of indices, wherein each index from the series of indices comprises one or more ray paths through a zone of interest, wherein an arrival time of each ray path is compared to a range of arrival times wherein the Quintero Wellbore Index for the zone of interest is determined by, QWI=(Arrival time of appropriate ray−Arrival time of theoretical ray with fast cement/Arrival time of theoretical ray if zone 100% filled with water−Arrival time of theoretical ray with fast cement).

* * * * *